United States Patent Office.

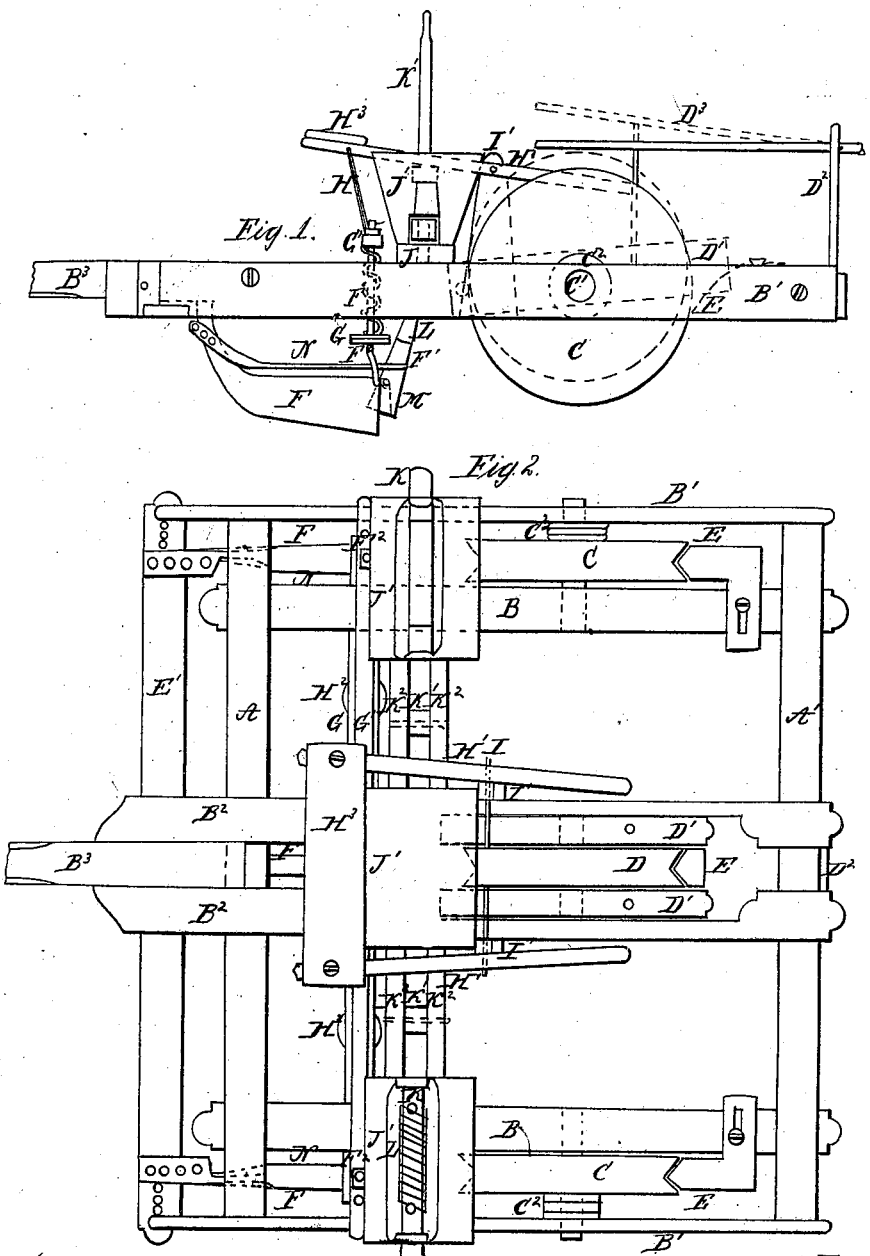

DANIEL D. FRANKLIN, OF FLORA, ILLINOIS, ASSIGNOR TO HIMSELF AND JOHN S. UNDERWOOD, OF SAME PLACE.

Letters Patent No. 92,951, dated July 27, 1869.

IMPROVEMENT IN CORN AND SEED-PLANTERS.

The Schedule referred to in these Letters Patent and making part of the same.

*To all whom it may concern:*

Be it known that I, DANIEL D. FRANKLIN, of Flora, Clay county, in the State of Illinois, have invented certain new and useful Improvements in Corn and Seed-Planters; and I hereby declare the following to be a full and exact description thereof, reference being had to the accompanying drawings, forming part of this specification.

The nature or essence of my invention consists in the peculiar construction and arrangement of devices described and claimed in the following specification, and represented in the drawings referred to.

In the accompanying drawings—

Figure 1 is an elevation of one side of a seed-planter, with my improvements.

Figure 2 is a plan or top view, without the seat $D^3$.

In these drawings—

A is the front and $A^1$ the rear bar, connected by the side bars B B and the side rails $B^1$ $B^1$, and middle bars $B^2$ $B^2$, the whole of them being fastened together, to make a strong frame, as shown in fig. 2, to which the other parts are fastened or connected.

The draught-pole $B^3$ is hinged between the ends of the bars $B^2$, to which pole the animals may be harnessed in some convenient manner, to draw the machine.

This frame is mounted on two carrying-wheels, C C, which turn on axles $C^1$ in the side bars, and rails B $B^1$ and the collars $C^2$, on the axles, may be put either side of the wheels, so as to run on the rows planted at different distances apart.

As my machine is intended to plant three rows at once, the axle of the centre wheel D is fitted in the bars $D^1$, which are arranged to vibrate on a pin passing through the middle bars $B^2$.

The standard $D^2$ is fastened to the rear of the frame, to support one end of the seat $D^3$, which is hung to vibrate freely in the standard, and its forward end is supported by standards in the bars $D^1$, so that a part of the weight of the driver is carried by the wheel D.

All the wheels are grooved to press the earth in on each side of the furrow, on to the seed planted, and the scrapers E E are arranged to clear the earth from the grooves in the wheels.

The furrowing-teeth, three in number, are made in the form shown in the drawing at F F F, and their forward ends are provided with a series of holes, to fasten them forward or backward on the bar E', arranged in front of the bar A, which bar $E^1$ is provided with a series of holes, to set the teeth further apart or nearer together, to make the rows planted the width desired.

The rear ends of the teeth F are divided and spread to receive the lower ends of the seed-tubes $F^1$, and the rear ends of the teeth are connected by eye-bolts $F^2$ through the bar G, to the bar G', which is connected by links H to the levers $H^1$, hung on the rod I, which is supported by standards I' I' from the bars $B^2$, so that the driver, by putting his feet on the rear ends of the levers $H^1$, can raise the furrowing-teeth, when he desires to turn the machine, or at other times.

The bar G is made in three pieces, with slots and bolts $H^2$, and the bar G' is provided with holes, so that the bolts $F^2$ may be set further apart or nearer together, to adjust the teeth a proper distance apart.

The bar G is made so thin as to be flexible, and the spiral springs $F^3$ are arranged on the bolts $F^2$, to permit the teeth to rise when they strike a stone or other obstruction, and pass over it.

The bar J is fastened to the top of the frame, and the seed-boxes J' are arranged on it, as shown in the drawings, to receive the seed, and the traversing-bar K is fitted to traverse in the bottom of these seed-boxes, and is moved to drop the seed by the hand-levers $K^1$ $K^1$, which vibrate on pins in the brackets $K^2$, fastened to the bar J, when moved by the driver or dropper, at a proper time, to drop the seed.

The bar K has two holes in it, in every seed-box, and is partially covered by a grid, or rack, L, made of wires arranged so near together that the kernels of corn will not pass between them, and the holes in the bar are alternately moved out from under the grid, when the corn falls into them, and then they are moved under the grid, and over the hole in the bar J, through which the corn or seed falls into the flexible tube $L^1$, which conducts it into the tube $F^1$, from which it falls to the ground, behind the furrowing-tooth F, and the grooved wheel C comes along and crowds the earth in, and covers the corn.

I also arrange a brush, $L^2$, over the grid L, which may be used, when desired, for corn or smaller seeds, either with or without the grid L. (See fig. 1, where the end of the seed-box is left off to show the interior.)

I put a pin through the seed-tube $F^1$, and hang the piece of bent sheet-metal M over it in the tube, so part of the seed will pass down each side, and scatter the seed in the hill, when desired.

I put the tubes $F^1$ down through the metal plate N, which extends forward over the tooth F, and is provided with a series of holes, by which it is fastened to the fore end of the tooth, so the seed-tube can be adjusted forward or back, as desired.

To plant a rhomboidal-shaped field with parallel oblique check-rows, to avoid short rows at the sides of the field, set the planting-tube, or both the planting-tube and tooth, forward on one side, and the opposite one backward on the other side, by changing the bolts which pass through the fore end of the tooth and the bar E', so that the lower ends of the planting-tubes will range obliquely across the machine, at the angle required, so as to drop the corn as desired across the field or lot being planted.

It will be most convenient for the driver to sit on the seat H³, fastened to the levers H¹, when operating the machine, so that his weight will press the furrowing-teeth into the ground, and get off readily when turning the machine. But if two persons operate the machine, one can sit on one seat, and the other on the other seat without inconvenience.

Having described my improvements in planting-machines,

What I claim, and desire to secure by Letters Patent, is—

1. In combination with the driver's or planter's seat, supported by the furrowing-teeth, the spring I, interposed between the seat and the furrowing-teeth, substantially as described, for the purpose set forth.

2. In combination with the arrangement covered by the first claim, hanging the axle of the centre carrying-wheel D, so that the wheel can vibrate vertically, and adapt itself to uneven ground, substantially as described.

3. In combination with the devices for setting the furrowing-teeth nearer together or further apart, the devices for adjusting the covering-wheels to follow the track of the furrowing-teeth.

4. The devices for setting the lower ends of the planting-tubes forward and backward, to plant the rows obliquely, substantially as described.

5. The grid, or rack L over the traversing seed-bar, or between the bar and brush.

DANIEL D. FRANKLIN.

Witnesses:
   JOSEPH F. WILCOX,
   JOHN S. UNDERWOOD.